United States Patent [19]
Wakagi et al.

[11] Patent Number: 5,777,702
[45] Date of Patent: Jul. 7, 1998

[54] LIQUID CRYSTAL DISPLAY DEVICE AND METHOD OF FABRICATING THE SAME BY PATTERNING SEMICONDUCTOR, INSULATOR, AND GATELINES WITH SINGLE MASK

[75] Inventors: Masatoshi Wakagi, Hitachi; Kenichi Onisawa, Hitachinaka; Masahiko Ando, Hitachi; Toshiki Kaneko, Chiba; Tetsuroh Minemura, Hitachiohta; Tomohiro Okada, Hitachi, all of Japan

[73] Assignee: Hitachi, Ltd., Tokyo, Japan

[21] Appl. No.: 588,446

[22] Filed: Jan. 18, 1996

[30] Foreign Application Priority Data

Jan. 30, 1995 [JP] Japan .................. 7-012298

[51] Int. Cl.⁶ .................. G02F 1/136; G02F 1/1345; H01L 21/00
[52] U.S. Cl. .................. 349/47; 349/152; 438/30
[58] Field of Search .................. 349/152, 47, 43; 438/30, 151, 161

[56] References Cited

U.S. PATENT DOCUMENTS 5,146,301  9/1992  Yamamura et al. .................. 349/152
5,555,112  9/1996  Oritsuki et al. .................. 349/46
5,691,782  11/1997  Nishikawa et al. .................. 349/47

*Primary Examiner*—Anita Pellman Gross
*Attorney, Agent, or Firm*—Antonelli, Terry, Stout & Kraus, LLP

[57] ABSTRACT

A liquid crystal display device can be fabricated through simplified processes, and provide a high product yield and excellent picture displaying characteristic. The liquid crystal display device includes a first substrate having thereon a plurality of drain wirings, a plurality of gate wirings crossing the plurality of drain wirings in a matrix array, a plurality of thin film transistors disposed in the vicinity of these crossings, and a plurality of pixel electrodes connected to the thin film transistors, respectively. A second substrate is disposed in opposing relation to the first substrate, and a liquid crystal layer is sandwiched between these substrates. Each terminal portion of the plurality of drain wirings and plurality of gate wirings is constructed with a metallic film covered with a transparent conductive film.

2 Claims, 9 Drawing Sheets

LIQUID CRYSTAL DISPLAY DEVICE AND METHOD OF FABRICATING THE SAME BY PATTERNING SEMICONDUCTOR, INSULATOR, AND GATELINES WITH SINGLE MASK

BACKGROUND OF THE INVENTION

The present invention relates to an active matrix type liquid crystal display device driven by a thin film transistor (TFT) and a method of fabricating the same.

In recent years, there have been increasing demands for a TFT-driven active matrix type liquid crystal display (LCD) device having a high cost performance. To meet such demands, cost reduction in the fabricating processes of a TFT-LCD with an amorphous silicon (a-Si) film technology applied thereto, i.e., a reduction in the number of the processes, an improvement of the throughput, an increase in product yield, and the like are necessary.

In order to achieve such objects, there has been proposed an active matrix type display device in Japanese Patent Publication No. Hei 4-26084 (1992), in which the semiconductor film of the TFT and the insulating film of the gate electrode are patterned into the same form as the gate wirings and the gate electrodes. It is aim, by forming the device into the structure described above, to simplify the fabricating processes and also to prevent breakage of the electrode wirings, thereby improving the reliability of the device and providing an increase in product yield.

Although the above described prior art configuration of the device was effective in effecting simplification of the fabricating processes, there was a problem with it in that the reliability of connections between the liquid crystal panel and the liquid crystal display driving circuit was low. Accordingly, the product yield in the connection process and the reliability test were low and, hence, it was difficult to lower the cost. Further, since a transparent conductive film used for the drain wiring had high resistance and a potential difference was produced in the drain wiring, there was a problem that uneven density was liable to occur in the display on the LCD screen.

SUMMARY OF THE INVENTION

An object of the present invention is to provide a liquid crystal display device and a fabricating method of the same, whereby the fabricating processes are simplified, high product yield is provided, and an excellent picture displaying characteristic is obtained.

A liquid crystal display device according to the invention comprises a first substrate having on a surface thereof a plurality of drain wirings, a plurality of gate wirings crossing the plurality of drain wirings in a matrix array, a plurality of thin film transistors disposed in the vicinity of each of the crossings, and a plurality of pixel electrodes connected to each of the thin film transistors, a second substrate disposed in opposing relation to the first substrate, and a liquid crystal layer sandwiched between the two substrates, in which metallic films of each of the terminal portions of the plurality of drain wirings and the plurality of gate wirings are covered by transparent conductive films.

A method of fabricating a liquid crystal display device according to the invention comprises the step of forming source electrodes and drain wirings on a substrate, the step of forming a semiconductor film, an insulating film and a metallic film in succession over the above substrate, forming source electrodes and drain wirings, and then patterning these films using the same mask pattern to thereby form gate wirings, the step of forming a protective insulating film on the gate wirings and forming a photoresist on the same, the step of patterning the protective insulating film using the photoresist and then forming a transparent conductive film on the same, and the step of removing the transparent conductive film at the region where the photoresist pattern was formed to thereby form terminal portions of the source electrodes and the drain wirings as well as pixel electrodes.

As the materials of the drain and gate wirings in the liquid crystal display device of the invention, Al, Cr, Mo, Ta, Ti, W, Nb, Fe, Co, Ni, and the like can be mentioned. It is also possible to deposit two kinds or more of these materials in layers. Further, as the material of the semiconductor layer, an Si film containing a crystal phase, other than a-Si, may be used.

At the time when the transparent conductive film is processed by a lift off method, the cross-sectional structures of the resist and the processed protective insulating film and gate insulating film become important factors affecting the processing accuracy of the transparent conductive film. When a circumferential deposit of the transparent conductive film is taken into consideration, it is desirable for the protective insulating film or the laminate of the protective insulating film and the gate insulating film to be etched backwardly from the resist. This can be achieved by using a material such as silicon nitride (SiN) for the protective insulating film and the gate insulating film and by performing dry etching using a gas such as $SF_6$. Further, in order to eliminate an unwanted transparent conductive film, it is desirable for the thickness of the protective insulating film or the total thickness of the protective insulating film and the gate insulating film to be twice as large, or preferably three times as large, as the thickness of the transparent conductive film or above.

Further, a method can also be used in which two kinds of resists are laminated. As the two kinds of resists, a resist of the polyimide system (for example, polyimide resin, polymethyl methacrylate, polymethyl glutarimide, and polymethyl isopropyl keton) may be used for the lower layer and a resist of the novolak system may be used for the upper layer. The resist of the polyimide system is eroded by an alkaline developer and goes backward from the resist of the upper layer. Then, the protective insulating film or the gate insulating film is processed by etching. At this time, backward etching is not particularly necessary. Thereafter, a transparent conductive film is formed and processing is made by the lift off method.

When crystalline ITO (a material for the transparent electrode formed by adding Sn oxide to In oxide) is used for the transparent electrode, it is necessary to set the substrate at a temperature of 100° C. or above. When a resist with a low heat resistivity is used, it may be desirable to form an amorphous ITO film at a lower temperature first and, then, after the resist has been removed, to crystallize ITO by heat treatment.

While a resist peeling liquid is used for peeling off the resist, a method may also be employed, such as peeling off the resist with a tape or using a peeling liquid after the resist has been peeled off with a tape.

In the conventional structure of the device, while a low-resistance metallic material (such as Al, Cr and Ta) was used for the gate wiring, ITO, which is the same material as that of the source electrode and pixel electrode, was used for the drain wiring in order to simplify the structure and decrease the number of the fabricating processes. By such means, the drain wiring, source electrodes, and pixel electrodes can be fabricated through a one time film depositing and photolithographic process. When a further decrease in the number of the processes is desired, it may be desirable to fabricate the thin film transistor layer, formed of a semiconductor layer and a gate insulating layer, and the gate wiring (gate electrode) layer through one and the same photolithographic process. Then, it becomes possible to fabricate the device through three photolithographic processes, i.e., the photolithographic process of the protective insulating film covering the whole surface of the device and having through holes for the pixel electrodes, in addition to the photolithographic process for the drain wiring, source electrodes and pixel electrodes and the photolithographic process for the thin film transistor layer and gate wiring.

The liquid crystal driving circuit (mounted on a tape carrier package: TCP) and the gate-drain wiring on the substrate are generally connected by an anisotropic conductive film. For the connection with the liquid crystal driving circuit at the peripheral portion of the substrate, at this time, ITO is being used for the drain wiring terminal and metal is being used for the gate wiring terminals. According to the actual results obtained in the past, the reliability of the connection of the metallic terminal with the TCP was not sufficiently high. On the other hand, since ITO is chemically stable, the reliability of the connection of it with the TCP is high. Therefore, the reliability of the device can be improved by covering the wiring terminals with ITO.

While ITO has been used for the drain wiring in the conventional structure of the device, if the drain wiring is structured by using a metallic conductive film, the wiring resistance can be decreased. Hence, the potential gradient from the starting point to the terminal point of the drain wiring becomes gentle and the displaying characteristic of pixels, such as the uniformity of the brightness, can be improved.

In the liquid crystal display device of the invention, after the protective insulating film, or the protective insulating film plus the gate insulating film, has been processed by photolithography, an ITO film is deposited on the resist pattern and it is subjected to patterning by the lift off method. By employing such a fabricating method, it is made possible, without increasing the number of the photolithographic processes, compared with that in the conventional fabricating method, to fabricate display devices which are excellent in their picture displaying characteristic and highly reliable as to their connections with peripheral circuits.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENTS

[Embodiment 1]

Figure 1:
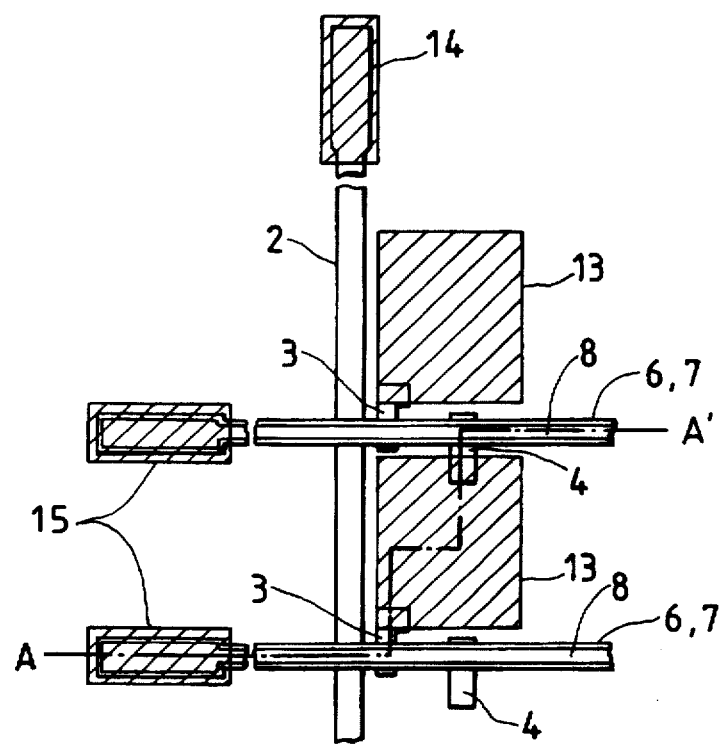
FIG. 1 is a schematic plan view of a substrate on the TFT side of a liquid crystal display device according to the invention.
Figure 2:
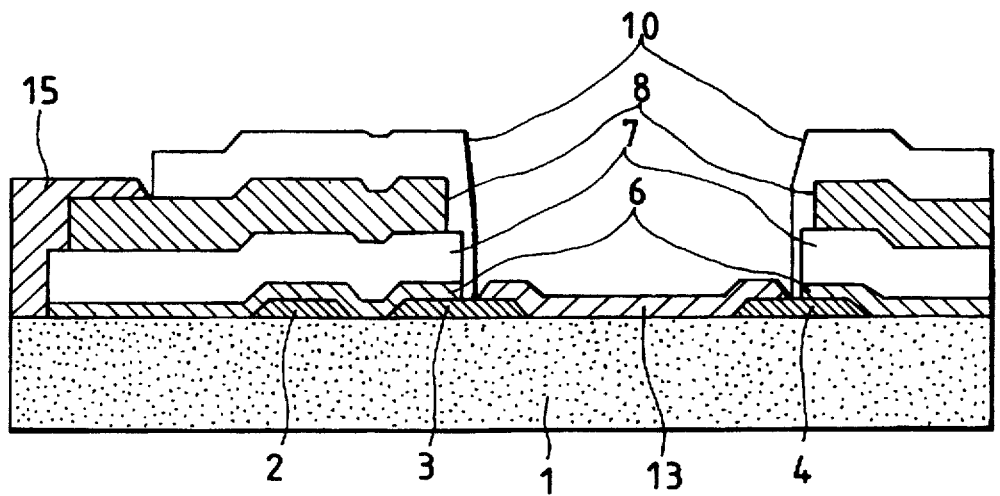
FIG. 2 is a schematic sectional view taken along line A-A' of FIG. 1.
Figure 3:
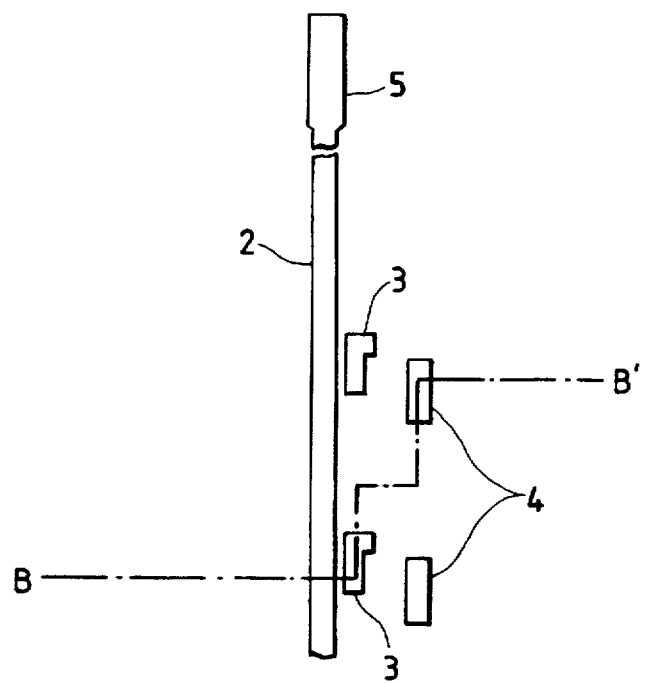
FIG. 3 is a schematic plan view following the fabricating process of the substrate on the TFT side shown in FIG. 1.
Figure 6:
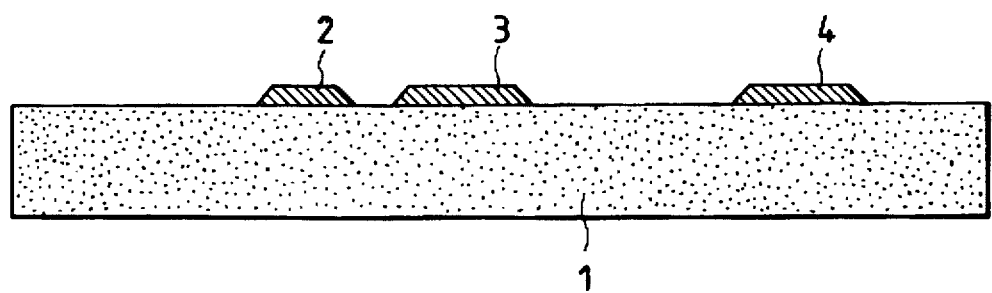
FIG. 6 is a schematic sectional view taken along line B-B' of FIG. 3.

FIG. 3 is a schematic plan view following the fabricating process of the substrate on the TFT side according to the present invention, and FIG. 6 is a schematic sectional view taken along line B-B' of FIG. 3.

A Cr film was formed on a transparent insulating substrate 1 by a magnetron sputtering method to a film thickness of 150 nm with the substrate temperature kept at 100° C. Then, the Cr film was subjected to etching and processed into a drain wiring 2, a source electrode 3, and an additional capacitance electrode 4. At this time, a water solution of $Ce(NH_4)_2(NO)_6$ with a suitable amount of $HNO_3$ added thereto was used as the etchant. The taper angle at the edge portion of the Cr film was about 10°.

Figure 4:
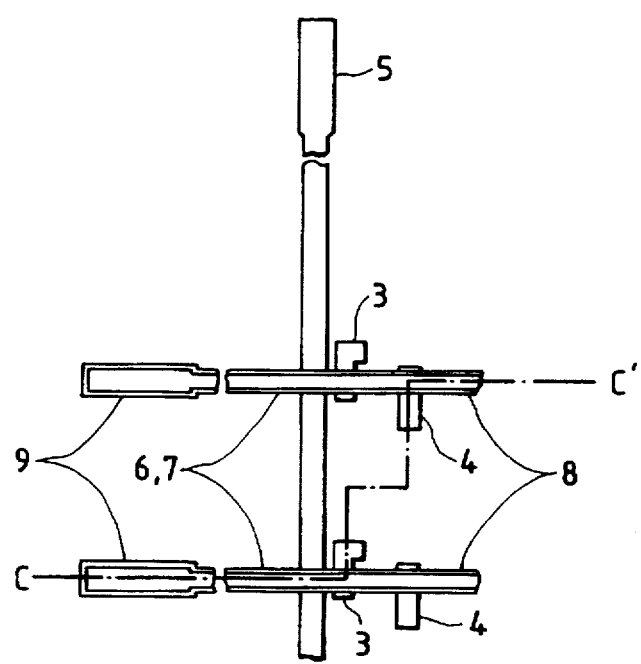
FIG. 4 is a schematic plan view following the fabricating process of the substrate on the TFT side shown in FIG. 1.
Figure 7:
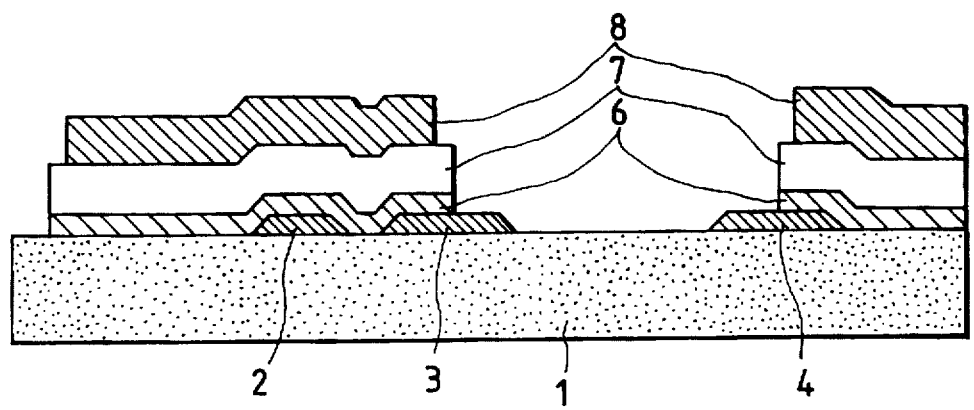
FIG. 7 is a schematic sectional view taken along line C-C' of FIG. 4.

FIG. 4 is a schematic plan view following the fabricating process of the substrate on the TFT side according to the invention, and FIG. 7 is a schematic sectional view taken along line C-C' of FIG. 4.

The substrate was set in an RF plasma CVD apparatus and subjected to $PH_3$ plasma processing and, thereafter, an a-Si:H film as a semiconductor layer 6 was formed. The substrate was kept at a temperature of 250° C. and monosilane $SiH_4$ was used as the material gas. The film thickness was set to 18 nm. The object in making the film so thin is to suppress the source-drain photoelectric current flowing though the semiconductor layer after the completion of the panel and to cause an increase in the off current of the transistor. The source-drain photoelectric current is proportional to the cube of the film thickness. In succession to the above, an SiN layer as a gate insulating film 7 was formed on the substrate in the same chamber. The substrate temperature was set to 250° C., the same as in the formation of the semiconductor layer, a mixed gas of $SiH_4$, $NH_3$, and $N_2$ was used as the material gas, and the film was formed to a thickness of 300 nm. Then, a Cr film for the gate wiring 8 was formed to a thickness of 150 nm by a magnetron sputtering method with the substrate kept at a temperature of 100° C. Then, the Cr film was subjected to etching and processed into gate electrodes. As the etchant, at this time, a water solution of Ce(NH$_4$)$_2$(NO)$_6$ with a suitable amount of HNO$_3$ added thereto was used. Then, by applying dry etching using the same mask pattern, the semiconductor layer and the gate insulating film were subjected to patterning. By this method, the gate wiring Cr could be processed to be set back from the patterned width of the semiconductor layer and gate insulating film by about 1.5 μm on either side. This is indicated by the line on the inside of the gate wiring 8 in FIG. 4. This amount of retreat provides a distance sufficient to prevent occurrence of shorting between the gate electrode 8 and the source electrode 3, as well as the drain wiring 2.

Figure 5:
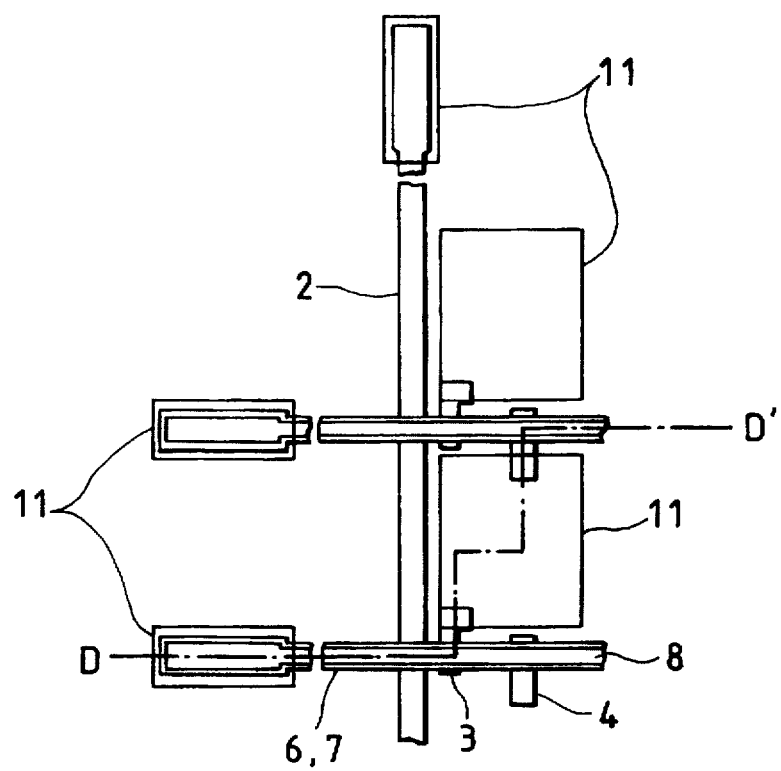
FIG. 5 is a schematic plan view following the fabricating process of the substrate on the TFT side shown in FIG. 1.
Figure 8:
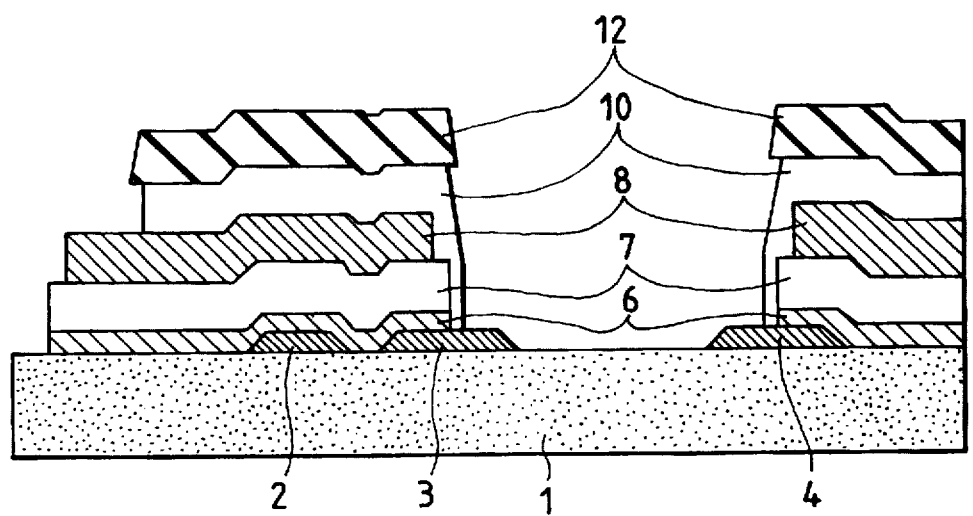
FIG. 8 is a schematic sectional view taken along line D-D' of FIG. 5.

FIG. 5 is a schematic plan view following the fabricating process of the substrate on the TFT side according to the invention. FIG. 8 is a schematic sectional view taken along line D–D' of FIG. 5.

Over the same, a protective insulating film 10 (SiN) was deposited by an RF plasma CVD method and, thereafter, a resist pattern (holed) 11 for terminal portions, the plane structure of which is shown in FIG. 5, was formed by photolithographic processing. Then, the protective insulating film was removed by dry etching, and, thereby, the Cr film for the gate wiring terminal portion, the Cr film for the source and drain wiring terminal portion, and the Cr film for the pixel electrode and the source electrode and the additional capacitance electrode connected to the same were exposed. Then, before peeling off the resist 12, an ITO film was deposited thereon to a thickness of 140 nm by sputtering. After the depositing of the ITO film, the resist was peeled off and the ITO film on the resist was lifted off.

In the liquid crystal display device of this invention, the terminal portions on the substrate on the TFT side are entirely covered with ITO. By virtue of such structure, after a liquid crystal display element was fabricated by laminating the substrate with the opposing substrate and sealing liquid crystal therebetween, it was found that a stable connection characteristic could be obtained when the device was connected with peripheral circuits. Also, it was found that a good displaying characteristic could be obtained with very little unevenness in the brightness.

[Embodiment 2]

In this embodiment, the fabricating condition of the semiconductor layer 6 was changed from that in the embodiment 1.

Namely, using an RF plasma CVD apparatus and subjecting a substrate to a PH$_3$ plasma treatment, a microcrystalline Si film was formed. The substrate was kept at a temperature of 300° C. and SiF$_4$ and H$_2$ was used as the material gas. The film thickness was set to 100 nm.

As a result of checking the connection characteristic of the device with peripheral circuits, the characteristic was found to be stable. Also, a good displaying characteristic was obtained.

[Embodiment 3]

Processing down to the step of forming the gate insulating film 7 was performed on a substrate by using the same method as in the embodiment 1. Then, an Al film for the gate wiring 8 was formed by a magnetron sputtering method to a film thickness of 250 nm with the substrate kept at a temperature of 100° C. In succession to the formation of the Al film, a Cr film was formed on the Al film by a magnetron sputtering method to a film thickness of 30 nm. The object of this was to obtain an electric connection between the Cr film and the ITO film at the gate wiring terminal portion. The reason why Al was used is because it has a lower resistance than Cr.

Thereafter, the gate wiring 8, gate insulating film 7, and semiconductor layer 6 were subjected to patterning by photolithography. At this time, first, the Cr film was etched by a water solution of cerium (II) nitrate ammonium and, then, the Al film was subjected to over-etching with the use of a water solution of the mixture of phosphoric acid, acetic acid, and nitric acid so that the Al film was set back from the resist pattern edge portion. Then, the Cr film was etched again in the same manner as described above. In succession, the gate insulating film 7 and the semiconductor layer 6 were subjected to patterning by dry etching. As a result of measurements, the amount of set back of the gate electrode (Cr/Al) from the pattern width of the semiconductor layer and gate insulating film was about 1.5 μm on either side.

Over the same, a protective insulating film 10 was formed by an RF plasma CVD method and, then, a resist pattern for forming the gate wiring terminal portion, the drain wiring terminal portion and the pixel electrode, as shown in FIG. 5, was formed by a photolithographic process. The protective insulating film was removed by dry etching, and, thereby, the Cr/Al film for the gate wiring terminal portion, the Cr film for the drain wiring terminal portion, and the Cr film for the source electrode and the additional capacitance electrode connected to the pixel electrode were exposed. Then, before peeling off the resist, an ITO film was deposited by sputtering to a thickness of 140 nm. After the ITO film had been deposited, the resist was peeled off and the ITO film on the protective insulating film pattern was lifted off.

A liquid crystal display device was fabricated using the substrate on the TFT side produced as described above and connected with peripheral circuits. As a result, it was found that a good connection characteristic was obtained. Further, a good displaying characteristic producing little unevenness in brightness was obtained.

[Embodiment 4]

Figure 11:
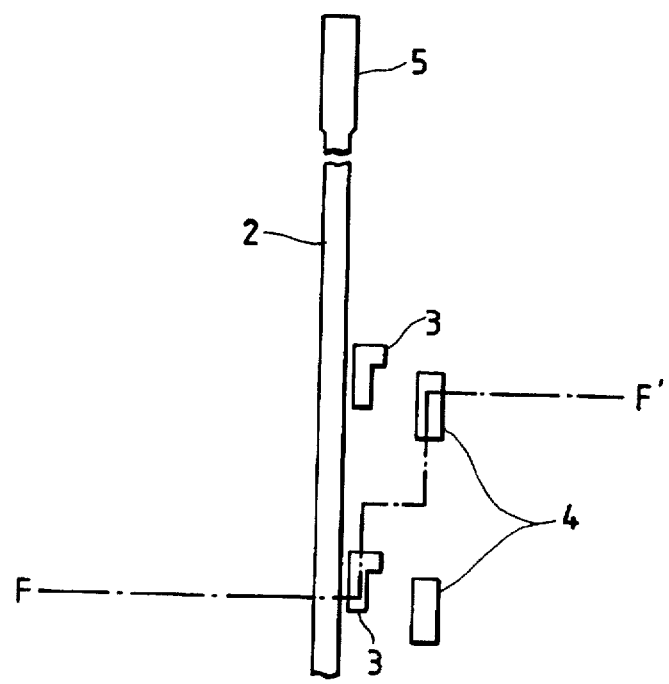
FIG. 11 is a schematic plan view following the fabricating process of the substrate on the TFT side shown in FIG. 9.
Figure 15:
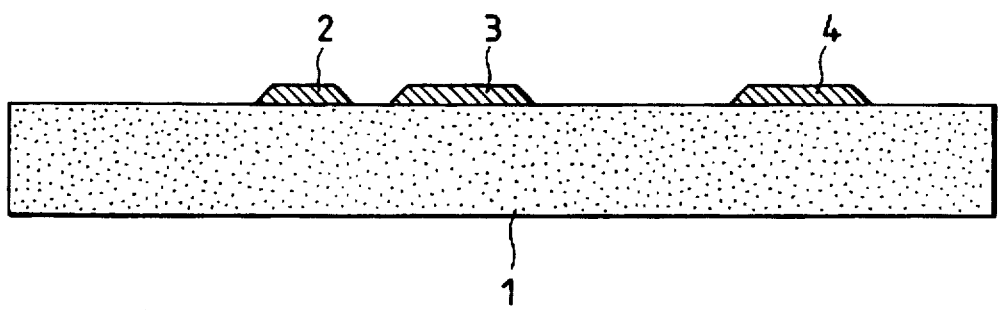
FIG. 15 is a schematic sectional view taken along line F-F' of FIG. 11.

FIG. 11 is a schematic plan view following the fabricating process of the substrate on the TFT side according to the invention. FIG. 15 is a schematic sectional view taken along line F–F' of FIG. 11.

Using the same film forming and etching methods as in the embodiment 1, the drain wiring 2, source electrode 3, and additional capacitance electrode 4 were formed on a transparent insulating substrate 1.

Figure 12:
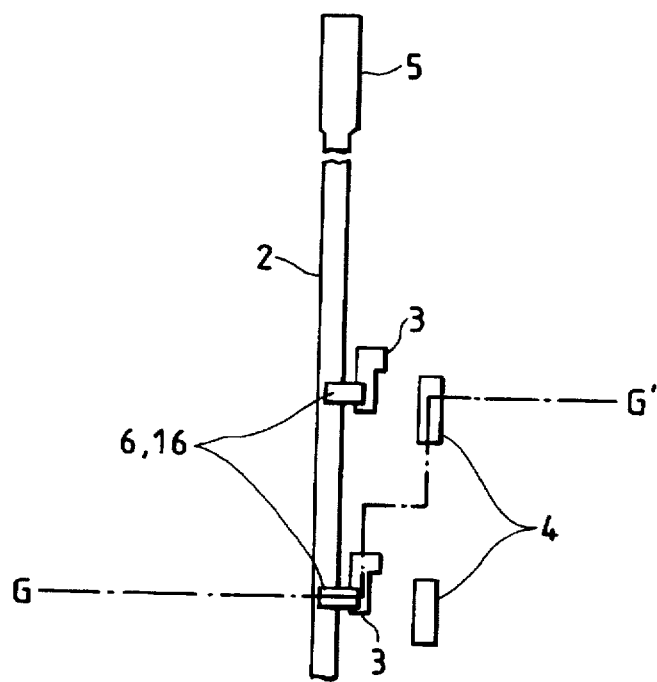
FIG. 12 is a schematic plan view following the fabricating process of the substrate on the TFT side shown in FIG. 9.
Figure 16:
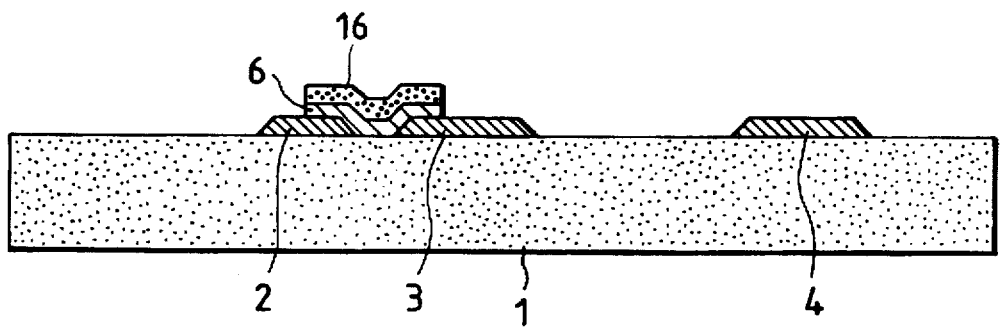
FIG. 16 is a schematic sectional view taken along line G-G' of FIG. 12.

FIG. 12 is a schematic plan view following the fabricating process of the substrate on the TFT side according to the invention. FIG. 16 is a schematic sectional view taken along line G–G' of FIG. 12.

The substrate was set in an RF plasma CVD apparatus and subjected to a PH$_3$ plasma treatment and, then, an a-Si:H film for the semiconductor layer 6 was formed by the same method as in the embodiment 1 to a thickness of 18 nm. Then, an SiN film for a first gate insulating layer 16 was formed by the same method as in the embodiment 1 to a thickness of 30 nm. Then, the semiconductor layer 6 and the gate insulating layer 16 were processed using the same mask pattern.

Figure 13:
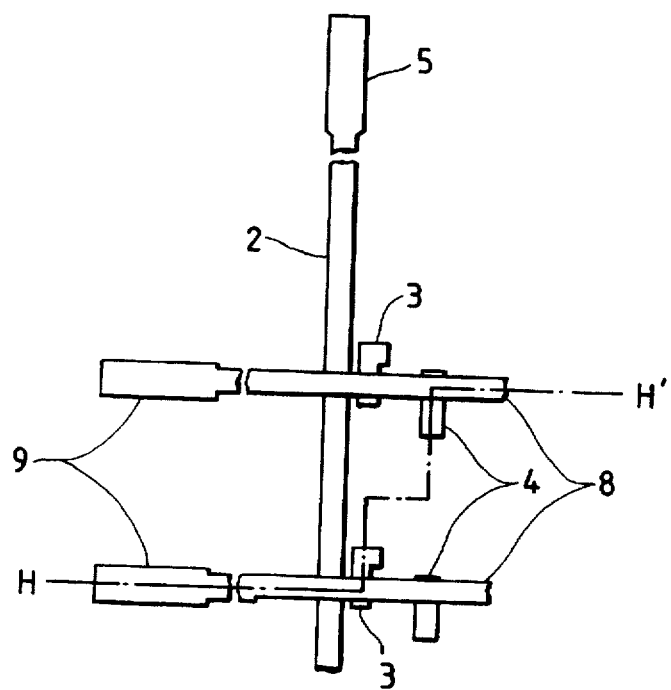
FIG. 13 is a schematic plan view following the fabricating process of the substrate on the TFT side shown in FIG. 9.
Figure 17:
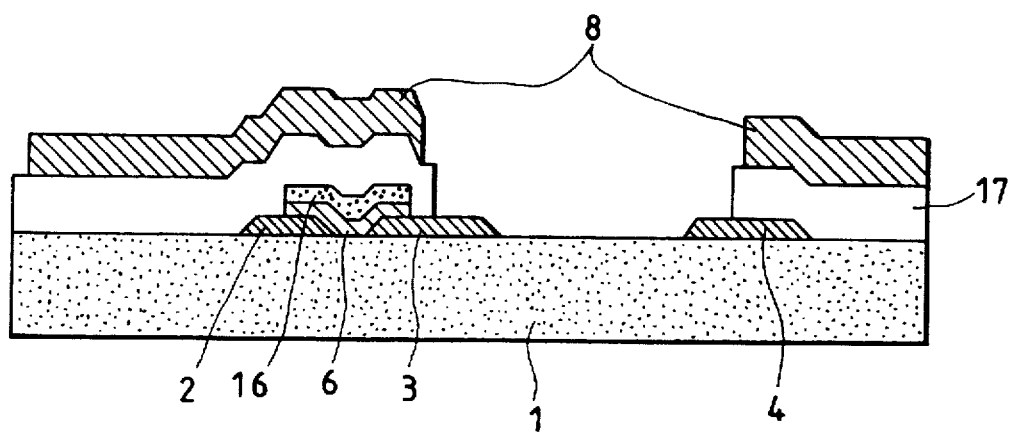
FIG. 17 is a schematic sectional view taken along line H-H' of FIG. 13.

FIG. 13 is a schematic plan view following the fabricating process of the substrate on the TFT side according to the invention. FIG. 17 is a schematic sectional view taken along line H-H' of FIG. 13.

The substrate was set in the RF plasma CVD apparatus and an SiN film for a second gate insulating layer 17 was formed by the same method as in the embodiment 1 to a thickness of 270 nm. Then, a Cr film for the gate wiring was formed by the same method as in the embodiment 1.

Figure 14:
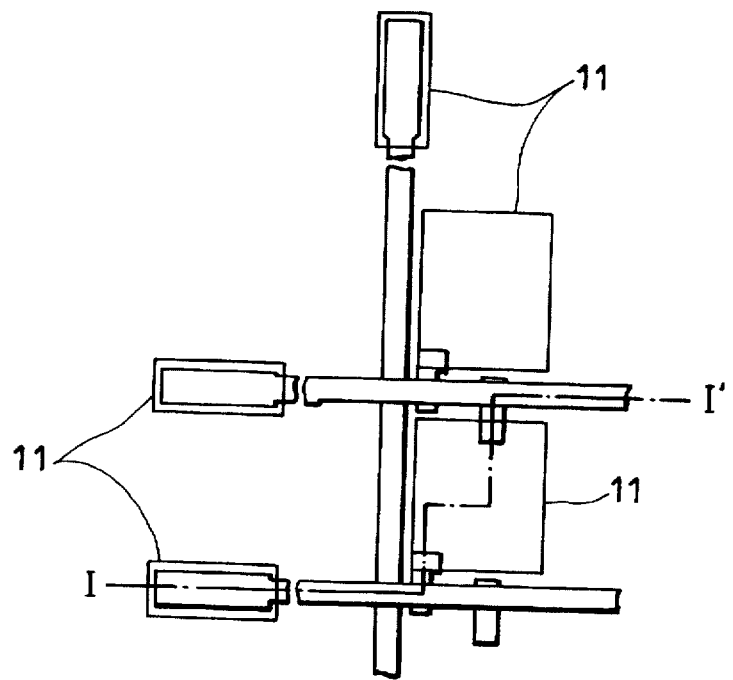
FIG. 14 is a schematic plan view following the fabricating process of the substrate on the TFT side shown in FIG. 9.
Figure 18:
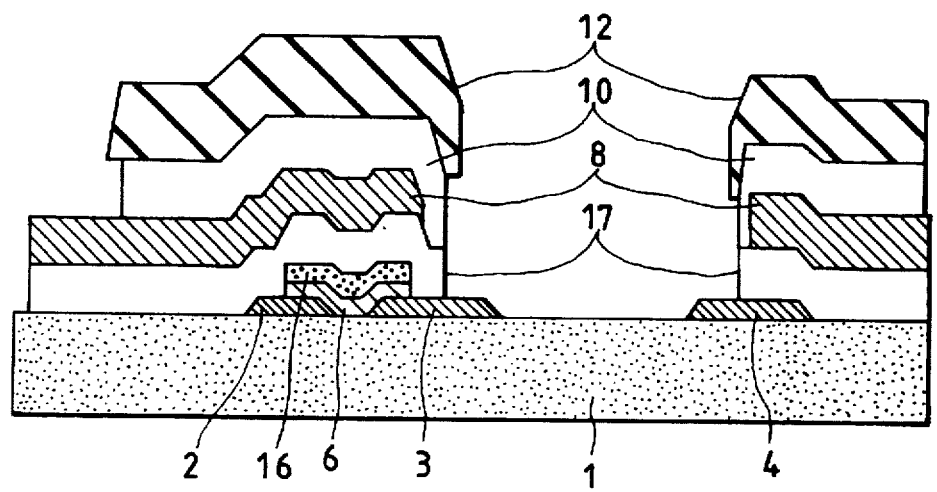
FIG. 18 is a schematic sectional view taken along line I-I' of FIG. 14.

FIG. 14 is a schematic plan view following the fabricating process of the substrate on the TFT side according to the invention. FIG. 18 is a schematic sectional view taken along line I-I' of FIG. 14.

The second gate insulating layer 17 and the Cr film were subjected to patterning using the same mask pattern and, thereby, the gate wiring 8 was formed. Over the same, the protective insulating film 10 was formed by a plasma CVD method to a thickness of 300 nm. Then, the protective insulating film 10 was removed by a dry etching method and, thereby, the Cr film for the gate wiring terminal portion 9 and the drain wiring terminal portion 5, and the Cr film for the pixel electrode portion and for the source electrode and the additional capacitance electrode connected thereto were exposed. Then, before peeling off the resist, an ITO film was deposited thereon by sputtering to a thickness of 200 nm. After the ITO film had been deposited, the resist was peeled off and the ITO film on the protective insulating film pattern was lifted off.

Figure 9:
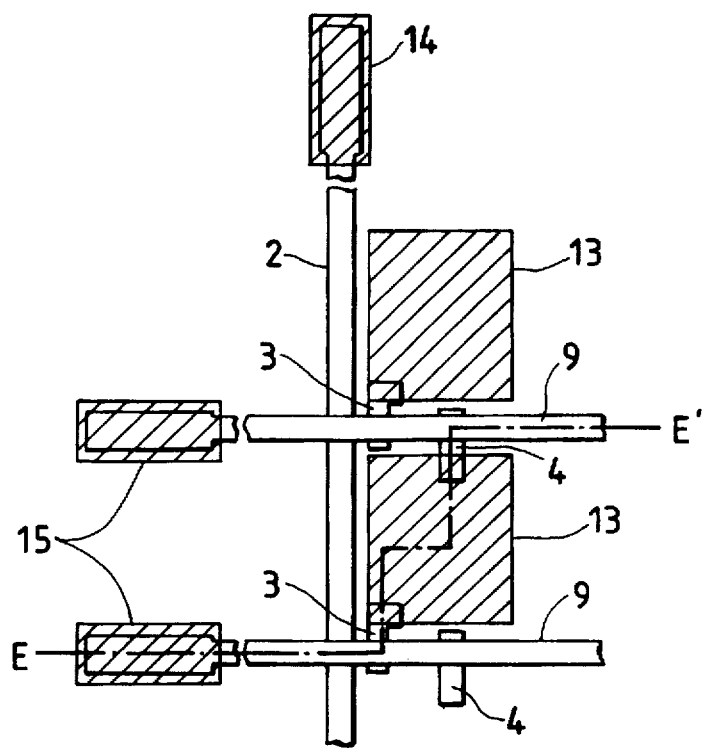
FIG. 9 is a schematic plan view of a substrate on the TFT side of a liquid crystal display device according to the invention.
Figure 10:
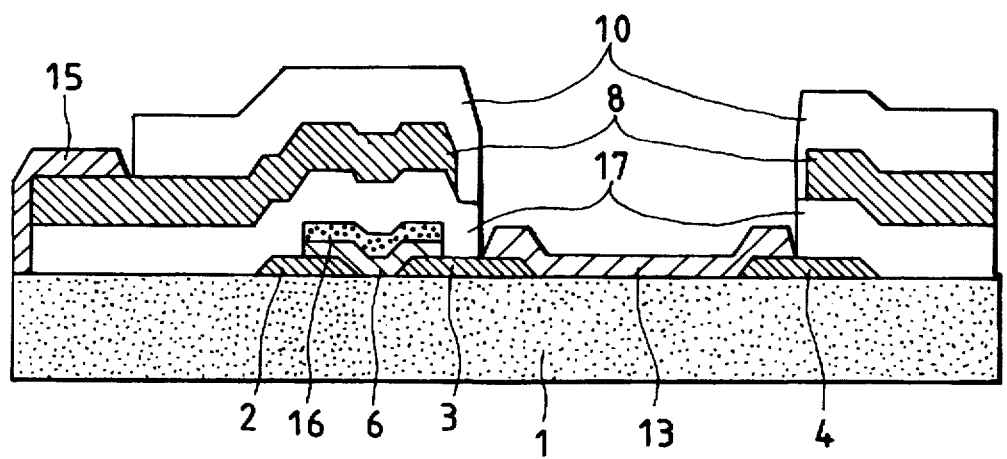
FIG. 10 is a schematic sectional view taken along line E-E' of FIG. 9.

A TFT substrate, as shown in FIG. 9 and FIG. 10, was produced in the described manner. A liquid crystal display device was fabricated using the substrate and connected with peripheral circuits. As a result, it was found that a good connection characteristic was obtained. Further, a good displaying characteristic producing little unevenness in brightness was obtained.

In the embodiment, the gate insulating layer is formed of two layers of insulating films, i.e., the first gate insulating layer 16 and the second gate insulating layer 17. Further, as to the auxiliary capacitance, only the second gate insulating layer 17 is inserted between the auxiliary capacitance electrode 4 and the gate wiring 8. At the portion in contact with the semiconductor layer 6 where the channel is formed, there is formed the first gate insulating layer 16 of high insulating quality and, at other portions than that, the second gate insulating layer 17 capable of being formed at a fast film forming speed is formed because the quality of the film is not important there. Thus, the characteristics of the TFT can be improved and, at the same time, the throughput in the fabrication can be increased. Also, the additional capacitance can be formed using the first gate insulating layer 16 of high quality. Further, by decreasing the thickness of the first gate insulating layer, an auxiliary capacitance providing a larger capacitance value with a smaller area can be formed.

[Embodiment 5]

Processing down to the step of forming the gate insulating film 7 was performed by using the same film forming and etching methods as in the embodiment 4. Then, a laminated film of Al 250 nm thick and Cr 30 nm thick for the gate wiring 8 was formed. Thereafter, the gate wiring 8 was subjected to patterning by photolithography in the same method as in the embodiment 3.

Over the same, the protective insulating film 10 was formed by a plasma CVD method to a thickness of 300 nm and, then, the protective insulating film was removed by dry etching and the Cr/Al film for the gate wiring terminal portion, the Cr film for the drain wiring terminal portion, and the Cr film for the pixel electrode portion and for the source electrode and the additional capacitance electrode connected to the same were exposed. Then, before peeling off the resist, an ITO film was deposited thereon by sputtering to a thickness of 200 nm. After the depositing of the ITO film, the resist was peeled off and the ITO film on the protective insulating film pattern was lifted off.

A liquid crystal display device was fabricated using the substrate on the TFT side produced as described above and connected with peripheral circuits. As a result, it was found that a good connection characteristic was obtained. Further, a good displaying characteristic producing little unevenness in brightness was obtained.

It was confirmed that it is possible also to apply an organic solvent having ultrafine particles of ITO dispersed therein, instead of the formation of the ITO film in the embodiment 1 and embodiment 4, and to subject the substrate to baking to thereby solidify the solvent and, then, to lift off the same.

What is claimed is:

1. A method of fabricating a liquid crystal display device comprising the steps of:

forming source electrodes and drain wirings on a substrate;

forming a semiconductor film, an insulating film, and a metallic film in succession on said substrate, source electrodes and drain wirings, patterning said semiconductor film, said insulating film and said metallic film using a mask pattern, to thereby form gate wirings;

forming a protective insulating film on said gate wirings and forming a photoresist on the protective insulating film;

patterning said protecting insulating film using said photoresist and then forming a transparent conductive film thereon; and removing said transparent conductive film at the region where said photoresist pattern was formed to thereby form terminal portions of said gate wirings and drain wirings, and pixel electrodes.

2. A method of fabricating a liquid crystal display device comprising the steps of:

forming source electrodes and drain wirings on a substrate;

forming a semiconductor film and a first insulating film in succession on said substrate, source electrodes and drain wirings, patterning said semiconductor film and first insulating film, using a mask pattern;

forming a second insulating film and a metallic film in succession;

patterning said second insulating film and said metallic film, using a mask pattern, to thereby form gate wirings;

forming a protective insulating film on said gate wirings and forming a photoresist on the protective insulating film;

patterning said protecting insulating film using said photoresist and then forming a transparent conductive film thereon; and removing said transparent conductive film at the region where said photoresist pattern was formed to thereby form terminal portions of said drain wirings and gate wiring, and pixel electrodes.

* * * * *